(12) United States Patent
Cejas

(10) Patent No.: US 10,317,175 B2
(45) Date of Patent: Jun. 11, 2019

(54) STRUCTURALLY REINFORCED AND WATER RESISTANT SOFT ARMOR PERIMETER

(71) Applicant: Alejandro F. Cejas, Miami, FL (US)

(72) Inventor: Alejandro F. Cejas, Miami, FL (US)

( * ) Notice: Subject to any disclaimer, the term of this patent is extended or adjusted under 35 U.S.C. 154(b) by 187 days.

(21) Appl. No.: 15/240,204

(22) Filed: Aug. 18, 2016

(65) Prior Publication Data

US 2017/0241748 A1    Aug. 24, 2017

Related U.S. Application Data

(60) Provisional application No. 62/298,787, filed on Feb. 23, 2016.

(51) Int. Cl.

| | |
|---|---|
| *F41H 5/04* | (2006.01) |
| *B32B 3/06* | (2006.01) |
| *B32B 5/02* | (2006.01) |
| *B32B 5/12* | (2006.01) |
| *B32B 5/26* | (2006.01) |
| *B32B 7/08* | (2019.01) |
| *B32B 3/08* | (2006.01) |

(52) U.S. Cl.
CPC ............ *F41H 5/0485* (2013.01); *B32B 3/06* (2013.01); *B32B 3/08* (2013.01); *B32B 5/022* (2013.01); *B32B 5/024* (2013.01); *B32B 5/12* (2013.01); *B32B 5/26* (2013.01); *B32B 7/08* (2013.01); *B32B 2250/20* (2013.01); *B32B 2307/7265* (2013.01); *B32B 2571/02* (2013.01)

(58) Field of Classification Search
CPC ................................... B32B 7/04; F41H 5/04
See application file for complete search history.

(56) References Cited

U.S. PATENT DOCUMENTS

| | | | | |
|---|---|---|---|---|
| 3,784,984 A | * | 1/1974 | Aileo | ........................ A42B 3/10 2/423 |
| 6,323,145 B1 | * | 11/2001 | Popper | ............... A41D 31/0061 442/366 |
| 2011/0061522 A1 | * | 3/2011 | Jarrett | ................... F41H 5/0485 89/36.02 |

* cited by examiner

*Primary Examiner* — Andrew T Piziali

(57) ABSTRACT

A structurally reinforced and water resistant, soft armor ballistic panel for use in body armor garments includes: a plurality of ballistic fabric layers, a liquid-resistant binding tape, and a binding thread. The plurality of ballistic fabric layers includes either a plurality of woven fabric layers, a plurality of unwoven fabric layers, or a combination thereof. The liquid-resistant binding tape perimetrically encompasses the plurality of ballistic fabric layers, wherein the liquid-resistant binding tape is retained in position by the binding thread; the binding thread being stitched through the liquid-resistant binding tape and the plurality of ballistic fabric layers. Together, the liquid-resistant binding tape and the binding thread retain the plurality of ballistic fabric layers in a structurally flat formation and prevent liquid or moisture from seeping into a raw cut edge of each of the plurality of ballistic fabric layers.

11 Claims, 7 Drawing Sheets

STRUCTURALLY REINFORCED AND WATER RESISTANT SOFT ARMOR PERIMETER

The current application claims a priority to the U.S. Provisional Patent application Ser. No. 62/298,787 filed on Feb. 23, 2016.

FIELD OF THE INVENTION

The present invention relates generally to soft armor ballistic panels. More specifically, the present invention provides a liquid-resistant binding tape and a binding thread to bind and seal a plurality of ballistic fabric layers.

BACKGROUND OF THE INVENTION

In the manufacture of bullet-resistant soft armor, the National Institute of Justice (NIJ) governs the certification process as it applies to the commercial armor marketplace for law enforcement, military, and private security personnel. The standard which applies to body armor is NIJ Standard 0101.06, and it requires a significant amount of testing on sample armor panels in order to validate the performance of the panels. The physical construction of the panels (materials and stitching techniques) is critical to the performance and consistency of the armor. One of the tests that is performed is a "conditioned armor" test whereby a specified number of armor panel samples are "tumbled" in a high heat and humidity chamber for 10 straight days and then shot. This "conditioning" typically causes the soft armor panels to lose their flat shape which can adversely affect ballistic performance.

Therefore it is an object of the present invention to provide a structurally reinforced and water resistant, soft armor ballistic panel. The present invention binds a plurality of ballistic fabric layers together using a liquid-resistant binding tape and a binding thread. The liquid-resistant binding tape is perimetrically disposed about the plurality of ballistic fabric layers, wherein the liquid-resistant binding tape seals a raw cut edge of each of the plurality of ballistic fabric layers. Meanwhile, the binding thread is stitched through the liquid-resistant binding tape and the plurality of ballistic fabric layers in order to secure the liquid-resistant binding tape in place. Together, the liquid-resistant binding tape and the binding thread retain the plurality of ballistic fabric layers in a structurally flat formation and prevent liquid and moisture from seeping into the raw cut edge of each of the plurality of ballistic fabric layers.

DETAIL DESCRIPTIONS OF THE INVENTION

All illustrations of the drawings are for the purpose of describing selected versions of the present invention and are not intended to limit the scope of the present invention.

The present invention is a structurally reinforced and water resistant, soft armor ballistic panel for use in body armor garments. Body armor garments are assemblies of ballistic panels arranged in the form of vests, abdominal wraps, leg wraps, arm wraps, and various other garments that may be worn by a user in order to protect the user's body. The present invention provides improved structural stability and water resistant qualities not found in traditional ballistic panels.

Figure 1:
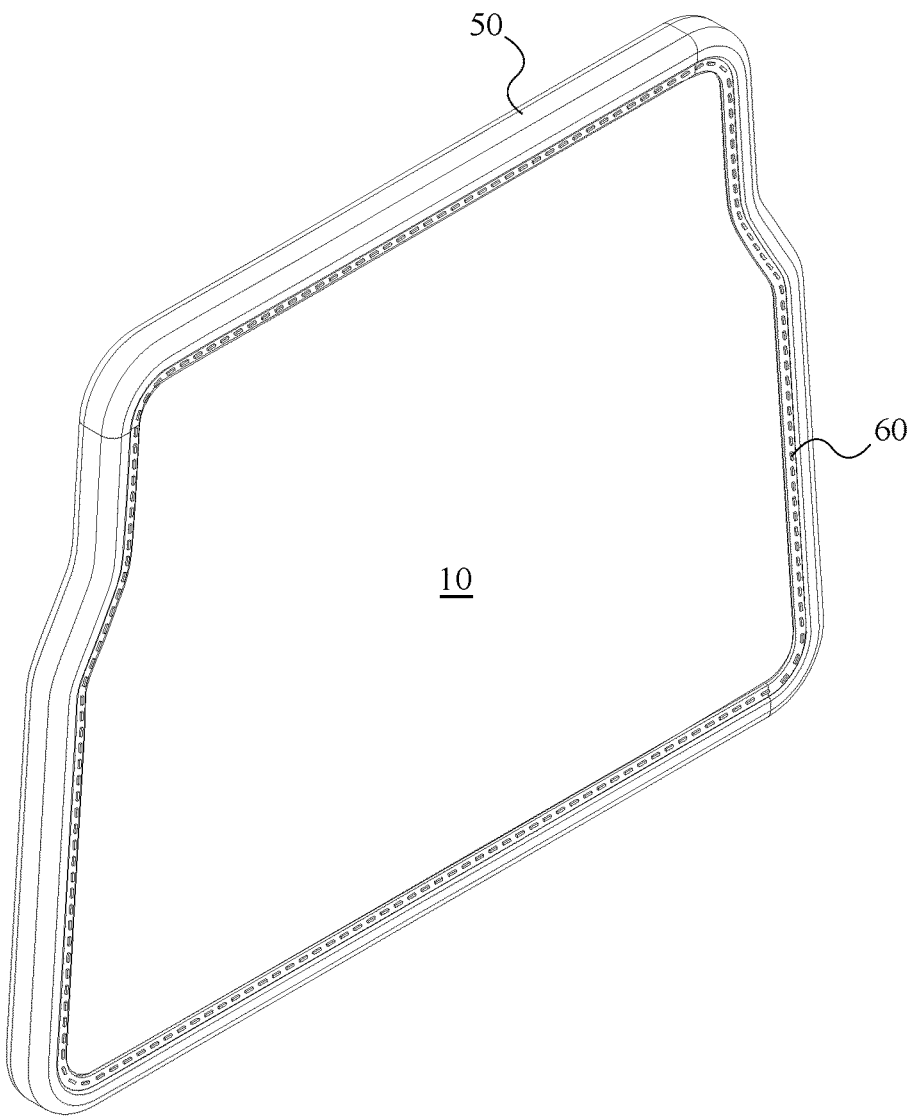
FIG. 1 is a perspective view of the liquid-resistant binding tape and the binding thread being perimetrically disposed about the plurality of ballistic fabric layers.

In reference to FIG. 1, the present invention comprises a plurality of ballistic fabric layers 10, a liquid-resistant binding tape 50, and a binding thread 60. The liquid-resistant binding tape 50 is stitched around the perimeter of the plurality of ballistic fabric layers 10 with the binding thread 60 in order to preserve the structural integrity of the plurality of ballistic fabric layers 10. Furthermore, the liquid-resistant binding tape 50 prevents moisture from seeping into the edges of the plurality of ballistic fabric layers 10, thereby extending the life and effectiveness of the ballistic panel.

The liquid-resistant binding tape 50 is an elongated strip of material that is perimetrically disposed about the plurality of ballistic fabric layers 10 in order to bind the plurality of ballistic fabric layers 10 together. The liquid-resistant binding tape 50 acts as a partial exoskeleton for the plurality of ballistic fabric layers 10, wherein structural integrity is preserved by the reinforcing nature of the materials used to construct the liquid-resistant binding tape 50. As such, the liquid-resistant binding tape 50 is composed of a material having high tensile and flexion strength capable of withstanding high-energy impacts.

Figure 6:
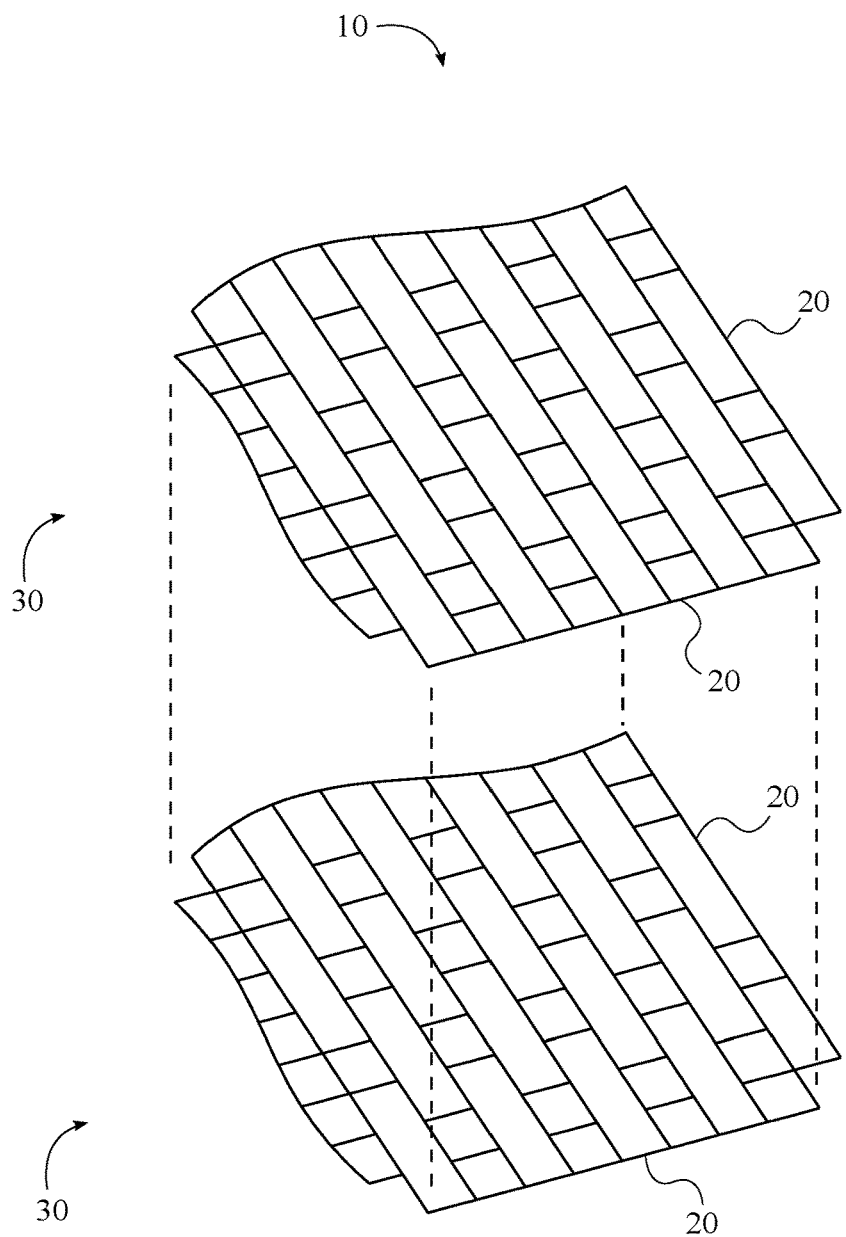
FIG. 6 is an exploded area view, wherein the plurality of ballistic fabric layers includes a plurality of woven fabric layers.
Figure 7:
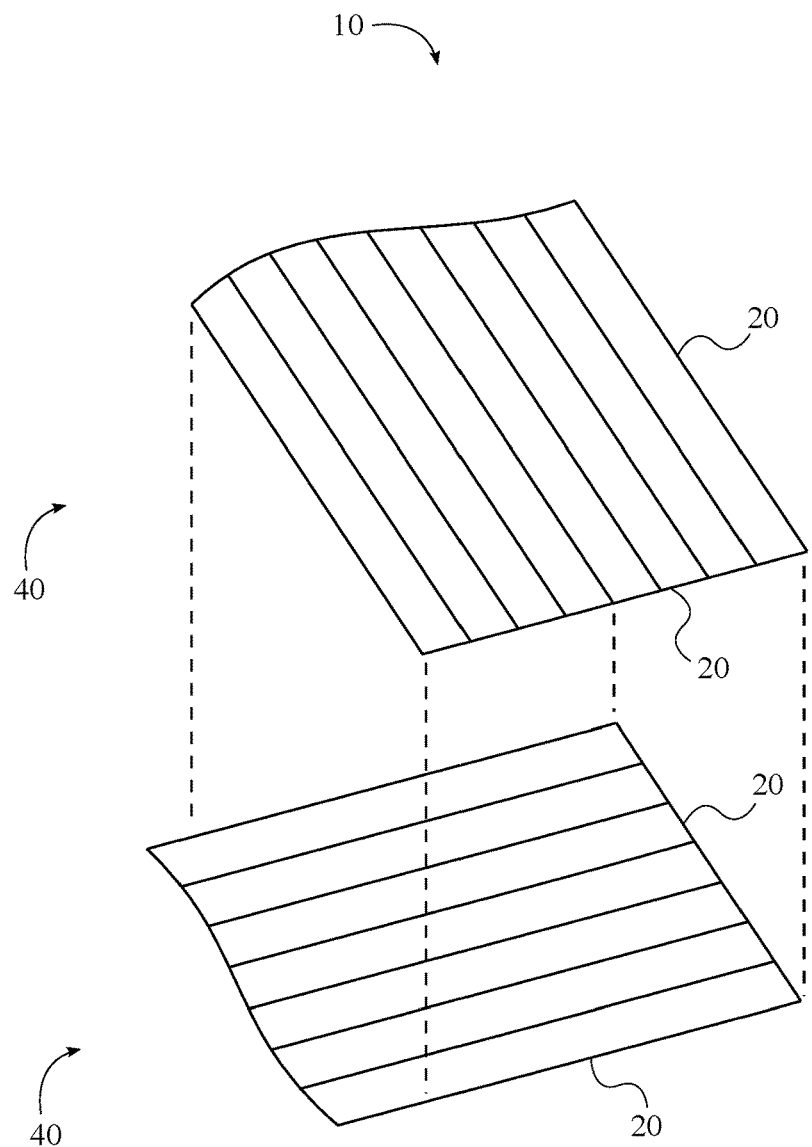
FIG. 7 is an exploded area view, wherein the plurality of ballistic fabric layers includes a plurality of unwoven fabric layers arranged in a cross-ply pattern.

The plurality of ballistic fabric layers 10 may comprise a plurality of woven fabric layers 30 as shown in FIG. 6, a plurality of unwoven fabric layers 40 as shown in FIG. 7, or a combination thereof. The plurality of unwoven fabric layers 40 may be arranged in a unidirectional pattern or in the cross-ply pattern depending on the embodiment. When used in conjunction with each other, the plurality of woven fabric layers 30 and the plurality of unwoven fabric layers 40 may be interspersed with each other. In some embodiments, the plurality of ballistic fabric layers 10 may further include laminate layers, film layers, or layers of other various materials.

Each of the plurality of ballistic fabric layers 10 comprises a raw cut edge 20 that is susceptible to wicking moisture and compromising the structural stability of the ballistic panel. As such, the liquid-resistant binding tape 50 has water resistant qualities to prevent the transfer of moisture from the surrounding environment to each of the plurality of layers. The liquid-resistant binding tape 50 may be constructed, solely or in part, by materials including, but not limited to, aramid, nylon, polyester, or polyethylene in order to provide both the water resistant qualities and high-energy impact absorption qualities.

Figure 2:
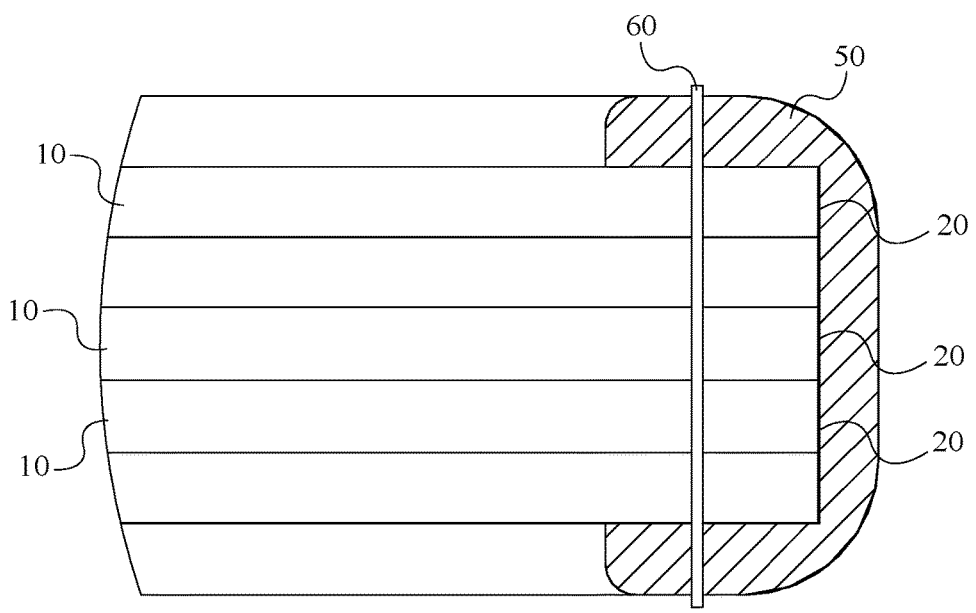
FIG. 2 is a cross-sectional area view showing the plurality of ballistic fabric layers being bound together by the liquid-resistant binding tape and the binding thread.

In reference to FIG. 2, the raw cut edge 20 of each of the plurality of ballistic fabric layers 10 is bound together by the liquid-resistant binding tape 50 in order to retain the plurality of ballistic fabric layers 10 in a structurally flat formation. The liquid-resistant binding tape 50 encases the perimeter of each of the plurality of ballistic fabric layers 10, thereby perimetrically sealing the raw cut edge 20 of each of the plurality of ballistic fabric layers 10. In this way, the liquid-resistant binding tape 50 prevents liquid and moisture from seeping into the raw cut edge 20 of each of the plurality of ballistic fabric layers 10 and compromising the integrity of the structurally flat formation.

In reference to FIG. 1-2, the binding thread 60 is stitched through the liquid-resistant binding tape 50 and the plurality of ballistic fabric layers 10, wherein the binding thread 60 retains the liquid-resistant binding tape 50 in position about the perimeter of the plurality of ballistic fabric layers 10. More specifically, the binding thread 60 is stitched along each of the longitudinal edges of the liquid-resistant binding tape 50, such that liquid-resistant binding tape 50 is fully secured to the plurality of ballistic fabric layers 10. As such, the binding thread 60 assists in retaining the plurality of ballistic fabric layers 10 in the structurally flat formation.

In reference to FIG. 2, the liquid-resistant binding tape 50 is tautly disposed about the raw cut edge 20 of each of the plurality of ballistic fabric layers 10, and is retained in position by the binding thread 60. In this way, the liquid-resistant binding tape 50, being pulled taut, provides a structured perimeter that secures the plurality of ballistic fabric layers 10. The taut disposition of the liquid-resistant binding tape 50 prevents the plurality of ballistic fabric layers 10 from shearing, or otherwise sliding, which in turn prevents the ballistic panel from bending. The preservation of the plurality of ballistic fabric layers 10 in the structurally flat formation ensures a flat ballistic panel that will retain the high-energy impact absorption qualities for which the ballistic panel was designed.

In the preferred embodiment of the present invention, mechanical lockstitches are utilized to stitch the binding thread 60 through the liquid-resistant binding tape 50 and around the perimeter of the plurality of ballistic fabric layers 10. However, alternative embodiments of the present invention may utilize other types of stitching, including but not limited to chain stitching, straight stitching, zigzag stitching, overlock stitching, cover stitching, running stitching, back stitching, outline stitching, satin stitching, or tacking stitching. The binding thread 60 may be stitched to the liquid-resistant binding tape 50 and the plurality of ballistic fabric layers 10 via conventional sewing binding machinery and equipment.

Figure 3:
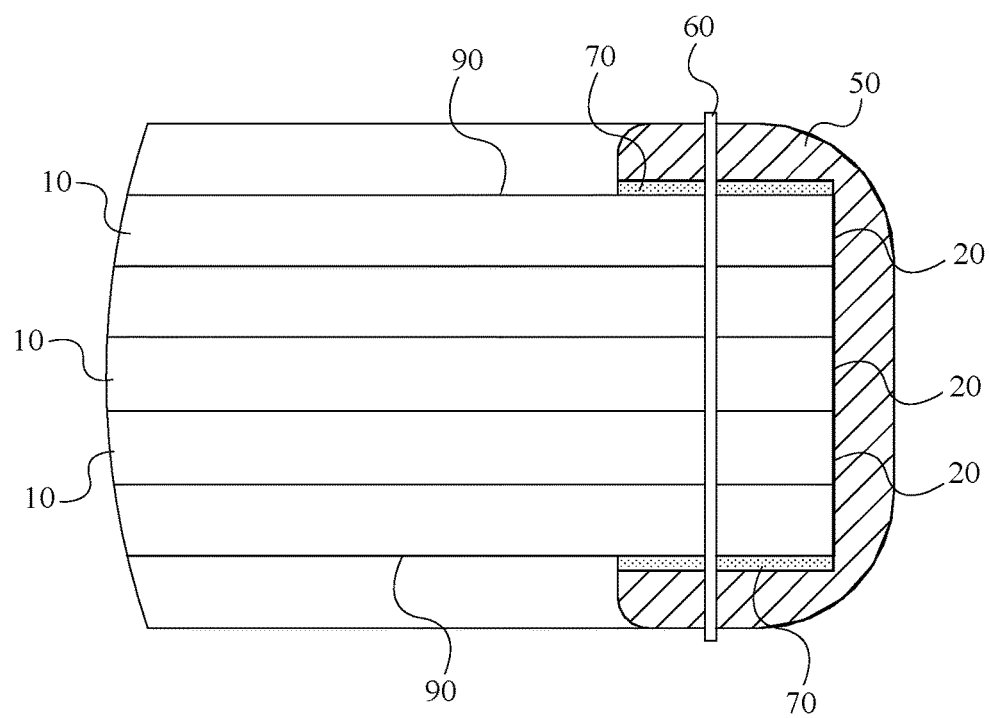
FIG. 3 is a cross-sectional area view depicting the adhesive being utilized to bind the liquid-resistant binding tape to the exterior surface of one of the plurality of ballistic fabric layers.

In reference to FIG. 3, in some embodiments of the present invention, an adhesive 70 may further be utilized to secure the liquid-resistant binding tape 50 to the plurality of ballistic fabric layers 10. The adhesive 70 is disposed between the liquid-resistant binding tape 50 and an exterior surface of one of the plurality of ballistic fabric layers 10 in order to chemically bind the liquid-resistant binding tape 50 to the plurality of ballistic fabric layers 10. More specifically, the adhesive 70 is applied to the surface of the liquid-resistant binding tape 50 coincident to the exterior surface, further aiding in retaining the liquid-resistant binding tape 50 in position and preserving the structural integrity of the plurality of ballistic fabric layers 10.

Ideally, the adhesive 70 is applied to the exterior surface of the two most outermost layers from the plurality of ballistic fabric layers 10; the two outermost layers being on opposing sides of the ballistic panel, as depicted in FIG. 3. To provide additional stability, the adhesive 70 may further be applied between the liquid-resistant binding tape 50 and the raw cut edge 20 of each of the plurality of ballistic fabric layers 10 in order to further secure the liquid-resistant binding tape 50 and seal the raw cut edge 20 of each of the plurality of ballistic fabric layers 10. The adhesive 70 may be composed of elastomers, thermoplastics, emulsions or thermosets, rubber, polychloroprene, acrylic, urethanes, polymides, epoxies, or polyvinyl acetate (PVAC). Furthermore, heat or ultrasonic seals may be used standalone, or in conjunction with the adhesive 70, to secure the liquid-resistant binding tape 50 to the plurality of ballistic fabric layers 10.

Mechanical fasteners may also be used in conjunction with the binding thread 60 and/or the adhesive 70 to secure the liquid-resistant binding tape 50 to the plurality of ballistic fabric layers 10. In reference to FIG. 4-5, in one embodiment, the mechanical fastener is a hook and loop fastening strip 80 that is connected in between the liquid-resistant binding tape 50 and the exterior surface of one of the plurality of ballistic fabric layers 10. The hook and loop fastening strip 80 includes a hook-fastener strip and a loop-fastener strip. The hook-fastener strip can be connected to the liquid-resistant binding tape 50, while the loop-fastener strip is connected to the exterior surface, or vice versa.

Figure 4:
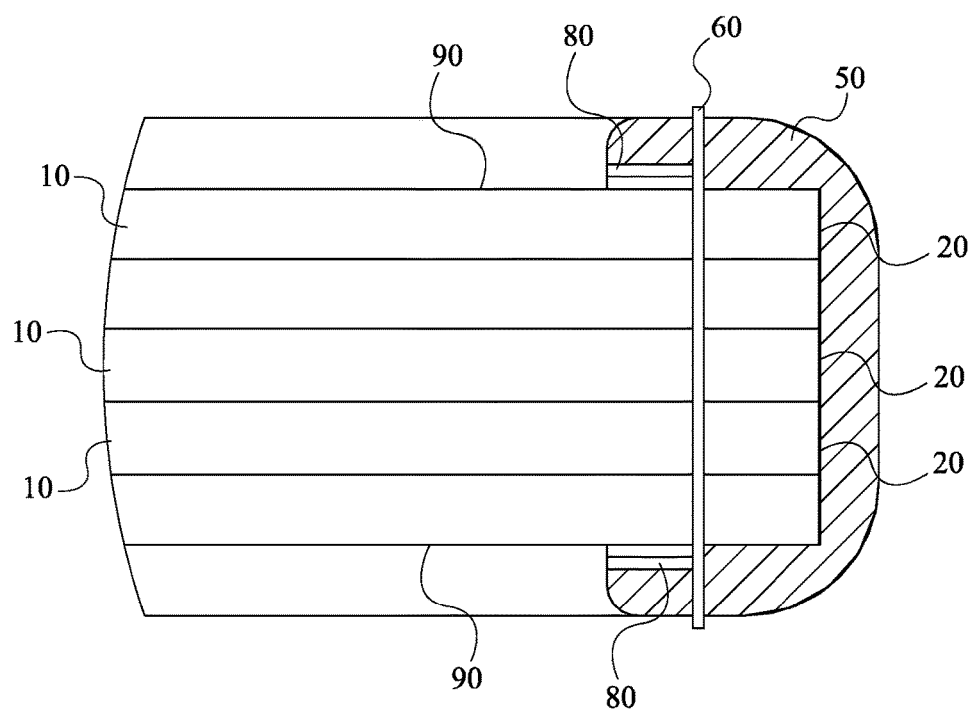
FIG. 4 is a cross-sectional area view depicting the hook and loop fastening strip being connected in between the liquid-resistant binding tape and the plurality of ballistic fabric layers.
Figure 5:
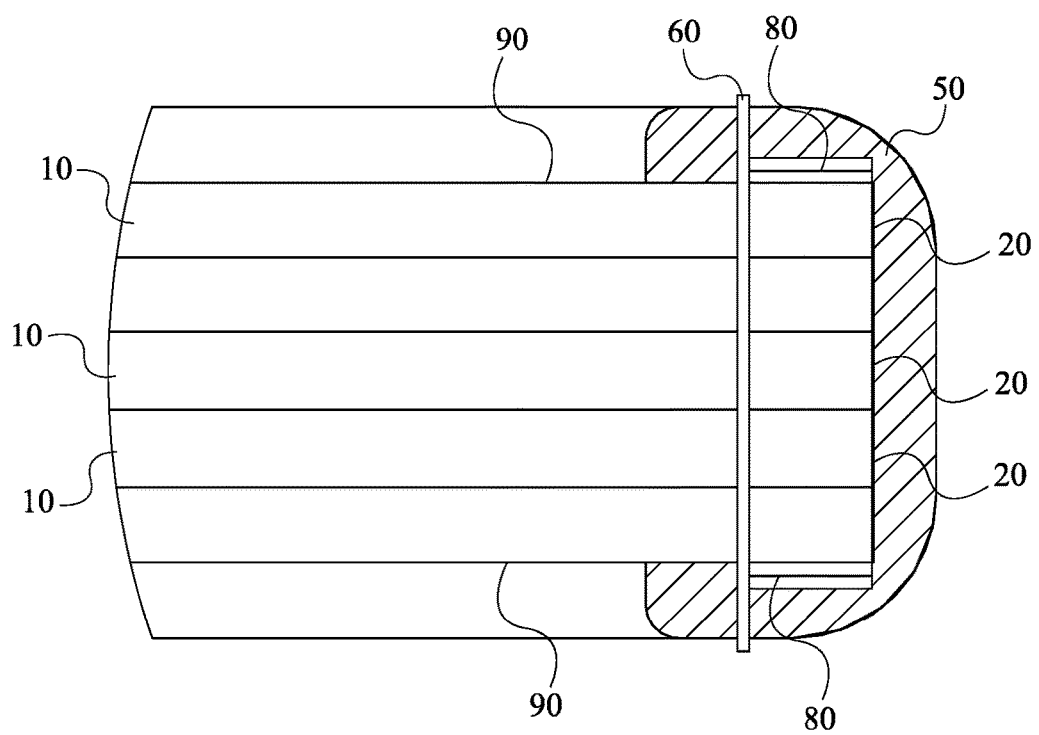
FIG. 5 is a cross-sectional area view depicting the hook and loop fastening strip being configured in an alternate position around the plurality of ballistic fabric layers.

The hook and loop fastening strip 80 is perimetrically positioned around the plurality of ballistic fabric layers 10. Furthermore, the hook and loop fastening strip 80 is positioned adjacent to the binding thread 60 in one of two positions. In a first position, the hook and loop fastening strip 80 is positioned in between the binding thread 60 and the raw cut edge 20 of one of the plurality of ballistic layers, as depicted in FIG. 5. Meanwhile, in a second position, the binding thread 60 is positioned in between the hook and loop fastening strip 80 and the raw cut edge 20 of one of the plurality of ballistic fabric layers 10, as depicted in FIG. 4. In either the first position or the second position, the hook and loop fastening strip 80 provides an additional means for retaining the liquid-resistant binding tape 50 in the desired position about the perimeter of the plurality of ballistic fabric layers 10.

The ballistic panel can be combined with one or more subsequent ballistic panels in order to form the desired body armor piece. The ballistic panel and the subsequent ballistic panels may be sleeved in a housing or attached to one another via mechanical fastening means. Such mechanical fastening means may include zippers, snaps, buttons, hook and loop fasteners, etc.

Although the invention has been explained in relation to its preferred embodiment, it is to be understood that many other possible modifications and variations can be made without departing from the spirit and scope of the invention as hereinafter claimed.

What is claimed is:
1. A structurally reinforced panel comprising:
a plurality of ballistic fabric layers;
a binding tape;
a binding thread;
an adhesive;
the plurality of ballistic fabric layers comprising two outermost ballistic fabric layers and at least one intermediate ballistic fabric layer;

each of the two outermost ballistic fabric layers and the at least one intermediate ballistic fabric layer comprising a cut edge;

the binding tape being perimetrically disposed about the plurality of cut edges so as to prevent moisture from seeping into the plurality of cut edges;

the adhesive being applied in between the binding tape and an exterior surface of each of the two outermost ballistic fabric layers without being applied to the at least one intermediate ballistic fabric layer;

the binding thread being stitched through the plurality of cut edges, the adhesive and the binding tape; and the plurality of cut edges being bound together by the binding tape, the adhesive and the binding thread in order to retain the plurality of ballistic fabric layers in a structurally flat formation.

2. The structurally reinforced panel as claimed in claim 1 comprising:

the adhesive being used to chemically bind the binding tape to the two outermost ballistic fabric layers.

3. The structurally reinforced panel as claimed in claim 1 comprising:

a hook and loop fastening strip; and the hook and loop fastening strip being connected in between the binding tape and an exterior surface of one of the plurality of ballistic fabric layers.

4. The structurally reinforced panel as claimed in claim 3 comprising:

the hook and loop fastening strip being positioned in between the binding thread and the cut edge of one of the plurality of ballistic fabric layers.

5. The structurally reinforced panel as claimed in claim 3 comprising:

the binding thread being positioned in between the hook and loop fastening strip and the cut edge of one of the plurality of ballistic fabric layers.

6. The structurally reinforced panel as claimed in claim 1, wherein the plurality of ballistic fabric layers comprising a plurality of woven fabric layers.

7. The structurally reinforced panel as claimed in claim 1, wherein the plurality of ballistic fabric layers comprising a plurality of unwoven fabric layers.

8. The structurally reinforced panel as claimed in claim 1, wherein the binding tape is constructed at least in part from aramid.

9. The structurally reinforced panel as claimed in claim 1, wherein the binding tape is constructed at least in part from nylon.

10. The structurally reinforced panel as claimed in claim 1, wherein the binding tape is constructed at least in part from polyester.

11. The structurally reinforced panel as claimed in claim 1, wherein the binding tape is constructed at least in part from polyethylene.

* * * * *